United States Patent
Eschler et al.

[11] 4,054,367
[45] Oct. 18, 1977

[54] PROCESS AND APPARATUS FOR HIGH RESOLUTION NON-MECHANICAL DEFLECTION OF LIGHT BEAMS

[75] Inventors: Hans Eschler, Munich; Gerd Goldmann, Taufkirchen, both of Germany

[73] Assignee: Siemens Aktiengesellschaft, Berlin & Munich, Germany

[21] Appl. No.: 645,818

[22] Filed: Dec. 31, 1975

[30] Foreign Application Priority Data

Jan. 7, 1975 Germany .............................. 2500380

[51] Int. Cl.$^2$ ............................................. G02F 1/29
[52] U.S. Cl. ................................. 350/150; 350/161 W; 350/DIG. 2
[58] Field of Search ............. 350/150, 161 W, DIG. 2

[56] References Cited

U.S. PATENT DOCUMENTS

| | | | |
|---|---|---|---|
| 3,529,886 | 9/1970 | Dixon et al. ..................... | 350/161 W |
| 3,544,806 | 12/1970 | DeMaria et al. ................ | 350/161 W |
| 3,897,152 | 7/1975 | Farmer et al. ................... | 350/161 W |

*Primary Examiner*—John K. Corbin
*Assistant Examiner*—R. A. Rosenberger
*Attorney, Agent, or Firm*—Hill, Gross, Simpson, Van Santen, Steadman, Chiara & Simpson

[57] ABSTRACT

A process and apparatus for non-mechanically deflecting of a light beam with high resolution characterized by passing a linearly polarized beam through at least one electro-optical deflector and preferably two to obtain four possible beam directions, passing the four beam directions through a multicomponent deflector of prisms which direct each of the four beam directions to a given point on an acousto-optical light deflector which is a two-dimensional acousto-optical light deflector that deflects the beam into two-dimensional arrays on a screen or storage medium, with each one of the four beam directions causing the two-dimensional arrays to be disposed in a different quadrant of the screen or medium. Preferably, the beams leaving the acousto-optic deflector are passed through a four component polarizing filter which prevents undesired overlap between the zero order undeflected portion of the beam and the first orders. In one embodiment, at least one of the electro-optical deflectors which comprises a polarization switch or rotator and a polarization dividing filter which is a birefringement discriminator, such as a Wollaston prism or a Nicols prism is separated with the polarization switch disposed ahead of the acousto-optical deflector and the polarization dividing filter receiving the deflected beams from the acousto-optical device.

12 Claims, 4 Drawing Figures

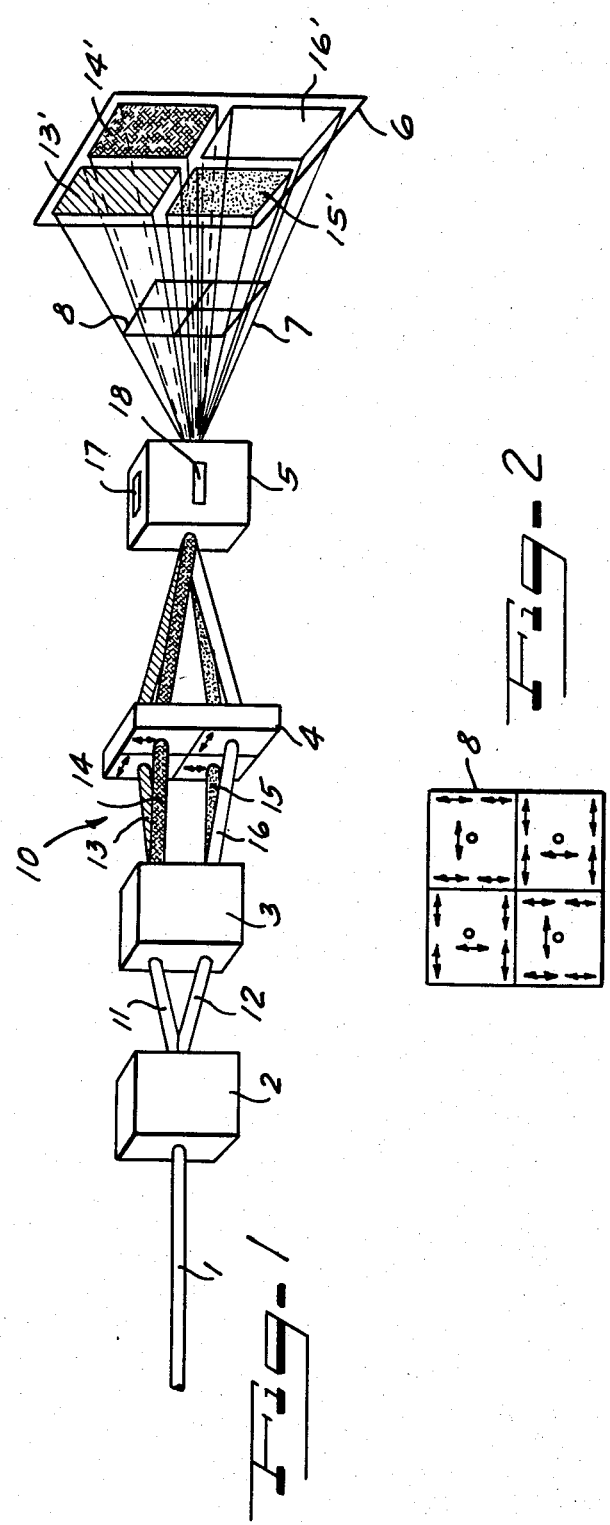

PROCESS AND APPARATUS FOR HIGH RESOLUTION NON-MECHANICAL DEFLECTION OF LIGHT BEAMS

BACKGROUND OF THE INVENTION

1. Field of the Invention

The present invention is directed to a method and a device for performing the method which produces a non-mechanical deflection of light beams with a high resolution by means of analogue acousto-optical light deflector and a digital electro-optical light deflector which method and device are particularly useful in optical printers and optical storage systems.

2. Prior Art

In optical printers, optical storage systems and in the reproduction of facsimile copies, light deflectors having a very high degree of resolution are required. For example, over a thousand resolvable beam directions are necessary.

Electro-optical and acousto-optical light deflectors are known per se. A particular advantage of an acousto-optical light deflector is that the beam direction can be adjusted or changed within microseconds. This electronic fine adjustment of the deflected light beam is of a great advantage in a deflector and particularly for a deflector used in a block organized holographic storage system and also in a deflector used in either a sequential holographic storage system or a non-holographic storage system which has a mechanically moving data carrier.

SUMMARY OF THE INVENTION

The present invention is directed to providing a particularly simple and effective process and device for obtaining high-resolution, non-mechanical deflection of light beams by means of a suitable acousto-optical and electro-optical light deflector in which the electro-optical light deflector need be adjusted only once in relation to the light beam which is being directed thereon from a fixed direction.

To accomplish these objects, the method and the device for performing the method utilize at least one electro-optical light deflector, a multi-component deflector means, and an acousto-optical light deflector. The device is arranged so that a linearly polarized beam of light is first projected through at least one or more electro-optical light deflectors, is received by the multi-component deflector means which is arranged to receive each deflected light beam from the electro-optical light deflector or deflectors and directs each of the beams at a point on an acousto-optical light deflector so that the position of the beams which are produced by the acousto-optical light deflector depends on the beam position produced by the electro-optical light deflector. Preferably, the acousto-optical light deflector is a two-dimensional acousto-optical light deflector deflecting the beam in two directions to produce a two-dimensional array of beam directions that are projected on a screen or storage medium. Also, it is preferred that at least two electro-optical deflectors are aligned in series with the second deflector deflecting the beams received from the first deflector in a direction at right angles thereto to produce four beam positions which are symmetrical to the axis of the device. Each one of the four beam positions will cause the two-dimensional array of beam directions to be projected on a different quadrant of the screen or storage medium.

In one embodiment of the invention, one of the electro-optical light deflectors is subdivided into its two parts comprising a polarization switch and a polarization dividing filter which is a bireinfringement discriminator. The polarization switch is positioned ahead of the acousto-optical light deflector and the polarization dividing filter is positioned to receive the two-dimensional array of beams from the acousto-optical deflector.

BRIEF DESCRIPTION OF THE DRAWINGS

FIG. 1 is a diagrammatic illustration of an embodiment of the present invention;

FIG. 2 is a plan view of a four component polarization filter utilized in the present invention;

FIG. 3 is a diagrammatic illustration of a second embodiment of the present invention.

DESCRIPTION OF THE PREFERRED EMBODIMENT

Figure 4:
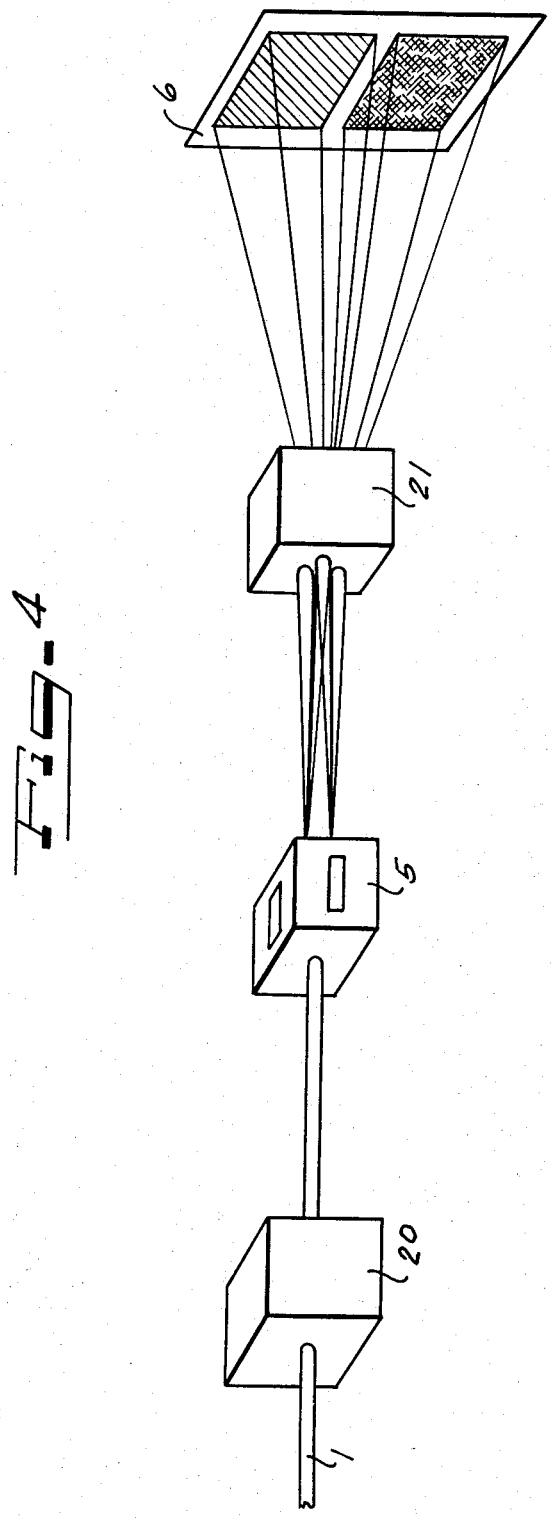
FIG. 4 is a diagrammatic illustration of another embodiment of the present invention.

The principles of the present invention are particularly useful when incorporated in a device generally indicated at 10 in FIG. 1 for non-mechanically deflecting a beam of light with a high resolution. Both the process and the device of the present invention utilize the passing of a light beam through a single electro-optical light deflector to selectively produce two light beams that are directed at an acousto-optical deflecting device and to produce two angles of incidence which will fulfill the Bragg condition. If both the directions produced by the single electro-optical deflector are symmetrical to the soundwave fronts in a two-stage, acousto-optical deflector, four equivalent directions will exist. Thus, when two electro-optical deflector stages are connected in series in a suitable fashion, it is possible to quadruple the number of directions of deflection which can be produced in the single acousto-optical deflector.

In the device 10, a linear polarized light beam 1, which may be a laser beam, is passed through electro-optical deflectors 2 and 3 which are arranged in series. In the electro-optical deflector 2, two possible beam positions 11 and 12 can be selectively produced. The electro-optical deflector 3 is arranged to deflect the beam in a direction at right angles to the direction of deflection of the deflector 2 and can produce four discrete beam positions 13, 14, 15, and 16 depending on the selected operations of the two deflectors 2 and 3.

From the electro-optical deflector 3, the beam produced by the deflectors 2 and 3 is received by a multi-component deflector means 4, which is composed of four parts such as four separate prisms. Each of the prisms is associated with one of the beam positions 13, 14, 15 and 16 and will direct the particular beam to a given area or point on an acousto-optical deflector 5. The acousto-optical deflector 5 is preferably a two-dimensional acousto-optical deflector, which has sound transducers 17 and 18 which are disposed on adjacent surfaces extending at right angles to each other, are connected to conventional drive electronic (not illustrated) and will produce a two-dimensional array of beam directions 7 that are directed onto a storage medium or screen 6. Due to the angle of incidence of each of the beam positions 13, 14, 15 and 16, the position of the two-dimensional array of beam directions 7 will be directed to a selected one of the four quadrants 13', 14', 15' and 16' on the screen 6. As illustrated, each of the quadrants corresponds to a given beam position 13, 14, 15 and 16 such as beam position 13 causing the array to fall in the quadrant 13'.

In order to prevent the zero order or undiffracted portion of one of the beam positions from overlapping or interferring with the first order of diffraction for another beam position, a multi-component polarization filter 8 is arranged between the acousto-optical light deflecting cell 5 and the screen 6. The polarization filter is divided into quadrants and provided with a different polarization filter portion for supression of the disturbing order for each of the quadrants. As illustrated in FIG. 2, the center of each quadrant of the filter 8 contains a spot exhibiting a polarization direction which is suppressed with the arrows adjacent the edge of each quadrant illustrating the polarization directions which are free to pass the particular filter portions.

An advantage of the device 10 is that the electro-optical deflectors such as 2 need only be adjusted in relation to the light beam 1 which is directed thereon from a fixed direction. Thus, the electro-optical deflector is not subjected to a light beam which exhibits variable directions of incidence that are emitted from an acousto-optical deflector. Therefore, suitable electro-optical materials may be selected and include those materials possessing natural birefringence with a correspondingly small half wave voltage.

In an embodiment illustrated in FIG. 3, it is easy to duplicate the acousto-optical deflector raster. In this embodiment, instead of using a second electro-optical deflector 3, the components of the deflector 3 which comprise a polarization switch or rotator 20 and a polarization dividing filter 21 which is a bireinfringement discriminator, such as a Wollaston prism or a Nicols prism, are separated. The polarization switch 20 is disposed ahead of the acousto-optical deflector 5 so that the beams that are directed by a two component deflector means 4' may have their polarization selectively rotated prior to entering the deflector 5. After the beam leaves the deflector 5, the polarization dividing filter 21 will shift the path of the two-dimensional array in accordance to the polarization imposed by the polarization switch 20.

In FIG. 4, the embodiment only uses one electro-optical deflector to produce two separate raster patterns of the acousto-optical deflector 5 on the screen 6. The electro-optical deflector may be either a single combined rotator 20 and polarization dividing filter 21 similar to the deflector 2 or 3 of FIG. 1 or the rotator 20 and filter 21 may be separated as illustrated in FIG. 3. As illustrated in FIG. 4, a linear polarized light beam 1, such as a laser beam, is directed at the polarization rotator 20 which is placed ahead of the acousto-optical deflector 5. The polarization dividing filter 21 is separated from the rotator 20 by the deflector 5 and receives the beam passing through the deflector 5 and shifts the path of the two-dimensional array produced by the deflector 5 in accordance with the polarization imposed by the rotator 20. Thus, the two separate arrays may be created on the screen 6.

Although the degree of acousto-optical deflection efficiency, which is a quality factor that differs even for isotropic materials, is generally unequal for two polarization directions which are at right angles to each other, this is of no disadvantage in the present method or device. The effect of the unequal deflection efficiency is relatively low for a series of acousto-optical significant materials, for example lead molybdate ($PbMoO_4$), iodic acid ($\alpha\text{-}HIO_3$), and SF 59 heavy flint glass. In addition the unequal deflection efficiencies can be compensated by appropriate adjustments of the power applied to each of the two transducers 17 and 18.

Although various minor modifications may be suggested by those versed in the art, it should be understood that we wish to employ within the scope of the patent granted hereon, all such modifications as reasonably and properly come within the scope of our contribution to the art.

We claim:

1. A method of non-mechanical deflecting of a beam of light with high resolution by means of a two-dimensional analogue acousto-optical deflector and at least one digital electro-optical deflector and particularly adapted for use in optical printers and optical storage systems, said method comprising directing a linearly polarized beam of light through at least one electro-optical light deflector, selectively operating the electro-optical light deflectors to deflect the beam in one of a plurality of selected directions, directing the beam at an acousto-optical light deflector, and selectively operating the acousto-optical light deflector to further deflect the beam into a two-dimensional array of beam directions.

2. A method according to claim 1, which further includes filtering the beams passing from the acousto-optical deflector to remove the zero order of diffraction so that the zero order and first order of diffraction do not overlap.

3. A method according to claim 1, wherein said step of directing the polarized light through at least one electro-optical deflector deflects the light through two electro-optical light deflectors in series with the second deflector deflecting the beam in a direction perpendicular to the direction of the first deflector so that four beam directions may be obtained, wherein the step of directing the beam at the acousto-optical light deflector passes each beam through a separate prism of a four prism component so that each beam is directed to the same spot on the acousto-optical deflector and each of the four beams determines the position of the two-dimensional array of beam directions.

4. A method according to claim 3, which further includes filtering the beams passing from the acousto-optical deflector to remove the zero order of diffraction so that the zero order and the first order of diffractions do not overlap and interfer.

5. A method according to claim 1, wherein the step of directing the beam at the acousto-optical light deflector, directs the beam through a polarization switch to selectively change the polarization of the beam prior to being received by the acousto-optical light deflector and wherein the array of beam directions created by the acousto-optical light deflector passes through a polarization dividing filter to change the position of the array of beam directions in response to the change in polarization caused by the polarization switch.

6. A method of non-mechanical deflecting of a beam of light with high resolution by means of an analogue acousto-optical deflector and at least two digital electro-optical deflectors and particularly adapted for use in optical printers and optical storage systems, said method comprising directing a linearly polarized beam of light through two electro-optical light deflectors in series with the second deflector deflecting the beam in a direction perpendicular to the direction of the first deflector so that four directions may be obtained, selectively operating each of the electro-optical light deflectors to deflect the beam into one of the four selected directions, directing the beam at an acousto-optical light deflector by passing the beam through a prism of a four prism component so that each beam is directed to the same spot on the acousto-optical light deflector, and selectively operating the acousto-optical light deflector to further deflect the beam.

7. A device for non-mechanically deflecting a beam of light with high resolution which device is particularly useful in optical printers and optical storage systems, said device comprising at least one electro-optical light deflector, a multi-component deflector means, and an acousto-optical light deflector, said electro-optical light deflector being positioned to receive a linearly polarized beam of light, said multi-component deflector means being arranged to receive each of the deflected light beams from the electro-optical light deflector and to direct each of the beams at a point on the acousto-optical light deflector so that the position of the beams produced by the acousto-optical deflector depends on the beam position produced by the electro-optical light deflector.

8. A device according to claim 7, wherein the acousto-optical light deflector is a two-dimensional acousto-optical light deflector deflecting the beam into two directions to produce a two-dimensional array of beam directions.

9. A device according to claim 8, which includes means for filtering the two-dimensional array of beam directions to remove the zero order of diffraction so that the zero order and first order of diffractions do not overlap, said means for filtering being subdivided into components with a component for each beam position produced by the electro-optical deflector.

10. A device according to claim 8, which includes a polarization switch positioned adjacent to the acousto-optical light deflector so that light beams directed at the acousto-optical light deflector passes therethrough and which includes a polarization dividing filter positioned adjacent to the acousto-optical deflector so that the array of beam directions created in the acousto-optical light deflector pass therethrough.

11. A device according to claim 8, which includes a first and second electro-optical light deflector arranged in series with the direction of deflection of the second deflector being at right angles to the direction of deflection of the first deflector so that four beam positions can be created.

12. A device according to claim 11, which includes a compound filtering means disposed to receive the array of beam directions from acousto-optical deflectors to remove the zero order of diffraction, said compound filtering means having a filter associated with each of the beam positions created by the electro-optical deflectors.

* * * * *